United States Patent Office 2,836,574
Patented May 27, 1958

2,836,574

AQUEOUS UREA FORMALDEHYDE AND MELAMINE FORMALDEHYDE WATER-RESISTANT HOT-SETTING ADHESIVES

Gordon E. Brown, Seattle, Wash., assignor to Monsanto Chemical Company, St. Louis, Mo., a corporation of Delaware No Drawing. Application February 11, 1954
Serial No. 409,759

4 Claims. (Cl. 260—29.4)

This invention relates to water-resistant hot-setting adhesives. More particularly the invention relates to modified urea-formaldehyde adhesives.

Urea-formaldehyde condensates of varying structure and composition have long been used as hot-setting adhesives for plywood. When properly formulated, these adhesives can be cured with reasonable speed at temperatures of above 70° F. A firm bond is obtained but the bond is weakened by exposure to moisture.

Attempts to overcome the water-sensitivity of these urea-formalydehyde condensates have generally resulted in an adhesive which could not be cured within a reasonable time at temperatures below 150° F.

One object of this invention is to provide hot-setting adhesives which when cured are moisture resistant.

A further object is to provide adhesives which can be cured within a reasonable time at temperatures as low as 100° F. to provide a moisture resistant bond.

Another object is to modify urea-formaldehyde adhesives to render them water-resistant after curing without destroying their low temperature cure properties.

These and other objects are attained by incorporating a specific melamine formaldehyde resin into a specific urea-formaldehyde resin together with an acidic catalyst.

The following examples are given in illustration and are not intended as limitations on the scope of this invention. Where parts are mentioned they are parts by weight.

Example I

To prepare the urea resins of this invention, react 60 parts (1 mol) of urea with from 160–200 parts (2–2.5 mols) of formalin (37% formaldehyde). The reaction should be started at a pH of 7–8 attained by the addition of a mild alkali or a buffer. The reaction is best carried out at reflux temperature at atmospheric pressure until the pH of the reaction medium drops to 5–6. When the pH becomes relatively constant, water is removed by distillation at atmospheric pressure to obtain an aqueous solution containing from 60–70% solids by weight. The reaction is then continued under reflux until a MacMichael viscosity on a #26 wire of 40–50 is obtained.

The product of this reaction is a viscous aqueous solution of a urea-formaldehyde condensate in which the formation of methylene bridges has been suppressed in favor of the formation of methylol groups. Substantially all of the condensate is completely water-soluble as evidenced by a practically complete absence of haze.

The urea-formaldehyde condensate so produced is an excellent hot-setting adhesive when properly compounded with fillers and catalysts. It may be cured to the insoluble infusible state at temperatures above 70° F. but the cured material is not water-resistant.

Example II

To prepare the melamine-formaldehyde condensates of this invention, react 130 parts (about 1 mol) of melamine with from 190–220 parts (from 2.3 to 2.7 mols) of formalin (37% formaldehyde) at a pH of 8–9 and at reflux temperature at atmospheric pressure. Continue the reaction until the 25° C. hydrophobe point is reached. Then recover the product by spray drying or other conventional quick drying means such as drum drying. The product is a water-dispersible condensation product which has been advanced considerably beyond the methylol melamine stage.

The product of Example II has the peculiar property of being insoluble in water at concentrations below 25% solids by weight but soluble in water at higher solids concentration. It may be compounded in a conventional manner and used as a hot-setting adhesive. However it cannot be cured at temperatures below 150° F. within a reasonable time and it has the disadvantageous property of being non-washable, i. e., it cannot be cleaned from glue spreaders and glue pots by merely washing it with water.

Example III

Mix 100 parts of a 62% solids aqueous solution prepared according to Example I with 10 parts of water and then add 30 parts of hardener A and 50 parts of the dry resin of Example II. Continue mixing until a smooth lump-free dispersion is obtained. Then add water with continued mixing to obtain the desired adhesive consistency. Generally from 10 to 20 parts of water will be sufficient.

The adhesive thus prepared has a pot life of at least 4 hours at 70° F. It is washable throughout the major portion of its pot life. When used to prepare plywood, a spread of 25 to 40 pounds per 1000 square feet of glue line should be used. After spreading, the plies are assembled and heated at 110° F. under pressure for about 1 hour. The resulting plywood is resistant to boiling water for 3 hours and the plies thereof cannot be separated without destroying the wood.

Example IV

Prepare an adhesive in a similar manner by incorporating 75 parts of the melamine-formaldehyde condensate in 100 parts of a 62% solids aqueous urea-formaldehyde condensate and using the same amount of hardener A. This adhesive may also be set at temperatures of 110° F. to give a boil resistant bond. The adhesive has a pot life of at least 4 hours and is washable.

When the amount of melamine resin is increased to 100 parts per 100 parts of urea resin solution, substantially the same results are obtained except that a little more water must be used to obtain a workable viscosity and a press temperature of 120° F. is needed to complete the cure in 1 hour.

Hardener A is a mixture of ammonium chloride and inert filler with the ammonium chloride being the active catalytic material. The ammonium chloride breaks down under the pressing conditions to provide an acidic medium which accelerates the curing rate. The ammonium chloride may be replaced in whole or in part by other inorganic salts or organic materials which break down or become activated at the press temperature to yield acidic materials. Examples of such catalysts are mono-ammonium phosphate and ammonium sulfate. The fillers are not essential but are conveninetly used to body the adhesive and to help disperse the catalyst throughout the adhesive. They should be relatively inert with respect to chemical reaction with either of the resins or formaldehyde.

The urea-formaldehyde condensates of this invention are limited to such condensates as contain a major proportion of methylol groups as compared to methylene bridges. They should be completely water-soluble and should be employed in aqueous solutions containing from 60 to 70% of such condensate solids by weight. The best method for obtaining these condensates is the method set forth in Example I.

The melamine resins which may be used are the reaction product of 1 mol of melamine with 2.3 to 2.7 mols of formaldehyde, the reaction having been carried past the formation of methylol groups to the 25° C. hydrophobe point. These resins are not water-soluble in concentrations below 25% solids by weight but are water-soluble at concentrations above 25% solids by weight. The resins should be in a dry pulverulent condition before being incorporated in the urea resin.

The amount of melamine-formaldehyde condensate which may be used to obtain the results of this invention may be varied from 75 to 200 parts based on 100 parts of solid urea-formaldehyde condensate. Referring to the examples, the ratio of solid urea-formaldehyde condensate to solid melamine-formaldehyde condensate is 100:80 in Example III, 100:120 in Example IV and 100:180 in the variation of Example IV. The two should not be mixed until it is desired to use the adhesive.

The amount of active catalyst may be varied between 0.2 and 10 parts per 100 parts of urea resin.

The curing temperature of the adhesives of this invention ranges from 80 to 150° F. At 80° F. the time necessary to effect a complete cure is quite long but can be advantageously used if the material being laminated can be kept under pressure for at least 16 hours. At 110 to 120° F. the dwell under pressure should be from 50 to 90 minutes and at 150° F. the dwell may be correspondingly reduced.

The preparation of the plywood in Examples III and IV shows pressing the plies at 110° F. to illustrate the feasibility of curing the adhesives of this invention at that temperature. In normal practice the press temperature will be at about 350–375° F. and the press will contain a large stack of plywood assemblies. Under these conditions the center assemblies ordinarily do not attain a temperature over 110–130° F. due to the slow heat transfer through the outer assemblies. Previous to this invention melamine resins could not be used advantageously in this process because the adhesive in the center assemblies did not cure. By using the modified adhesives of this invention, all of the adhesive in all of the assemblies including the centermost assemblies is fully cured to give a water-resistant bond.

What is claimed is:

1. An adhesive comprising an aqueous solution of 100 parts of a water-soluble urea-formaldehyde condensate, from 75–200 parts of a melamine-formaldehyde condensate and an acidic curing catalyst, said urea condensate having been prepared by heating at reflux temperature and atmospheric pressure 1 mol of urea with from 2–2.5 mols of formaldehyde starting at a pH of 7–8 and continuing said heating until the pH drops to 5–6 whereby a condensate is produced containing a preponderance of methylol groups as compared to methylene bridges, said melamine condensate having been prepared by reacting 1 mol of melamine with 2.3–2.7 mols of formaldehyde at a pH of 8–9 at reflux temperature and atmospheric pressure whereby a condensate is produced which is soluble in water only in concentrations above 25% solids by weight.

2. An adhesive as in claim 1 wherein 100 parts of urea condensate are used for each 120 parts of melamine condensate.

3. An adhesive as in claim 1 wherein 100 parts of urea condensate are used for each 80 parts of melamine condensate.

4. An adhesive as in claim 1 wherein 100 parts of urea condensate are used for each 180 parts of melamine condensate.

References Cited in the file of this patent
UNITED STATES PATENTS

| | | |
|---|---|---|
| 2,385,383 | Schroy | Sept. 25, 1945 |
| 2,455,392 | Bailey et al. | Dec. 7, 1948 |
| 2,559,349 | Detwiler | July 3, 1951 |